US012798094B2

(12) United States Patent
Hiraoka et al.

(10) Patent No.: US 12,798,094 B2
(45) Date of Patent: Nov. 17, 2026

(54) PLANNER DEVICE, PLANNING METHOD, PLANNING PROGRAM RECORDING MEDIUM, LEARNING DEVICE, LEARNING METHOD, AND LEARNING PROGRAM RECORDING MEDIUM

(71) Applicant: NEC Corporation, Tokyo (JP)

(72) Inventors: Takuya Hiraoka, Tokyo (JP); Takashi Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1005 days.

(21) Appl. No.: 17/927,086

(22) PCT Filed: Jun. 1, 2020

(86) PCT No.: PCT/JP2020/021528

§ 371 (c)(1),
(2) Date: Nov. 22, 2022

(87) PCT Pub. No.: WO2021/245720

PCT Pub. Date: Dec. 9, 2021

(65) Prior Publication Data

US 2023/0211498 A1 Jul. 6, 2023

(51) Int. Cl.
*B25J 9/16* (2006.01)

(52) U.S. Cl.
CPC ............. *B25J 9/1664* (2013.01); *B25J 9/163* (2013.01)

(58) Field of Classification Search
CPC ......... G06N 20/00; B25J 9/163; B25J 9/1664; G05B 13/0265
See application file for complete search history.

(56) References Cited

U.S. PATENT DOCUMENTS

| | | | | |
|---|---|---|---|---|
| 8,229,630 B2 * | 7/2012 | Klug | G07C 5/085 340/436 |
| 2017/0028553 A1 * | 2/2017 | Tsuda | G06N 3/098 |
| 2017/0243135 A1 * | 8/2017 | Ooba | G06N 3/006 |

(Continued)

FOREIGN PATENT DOCUMENTS

| | | |
|---|---|---|
| JP | 2007-018490 A | 1/2007 |
| JP | 2018-106466 A | 7/2018 |

(Continued)

OTHER PUBLICATIONS

Ronecker et al., Deep Q-Network Based Decision Making for Autonomous Driving, 2019, IEEE, pg., (Year: 2019).*

(Continued)

*Primary Examiner* — Mcdieunel Marc
(74) *Attorney, Agent, or Firm* — Sughrue Mion, PLLC

(57) ABSTRACT

A state acquisition acquires a state of a control target at a first time. An action decision decides on an action at a second time that is a control timing subsequent to the first time such that a value calculated when the state has been input to a pre-trained value function is largest. The value function is trained such that a value related to a sum of rewards based on states of the control target at control timings between the second time and a third time subsequent to the second time is calculated when a process of deciding on an action between the second time and the third time from the state of the control target at the first time and the action at the second time has been iterated.

7 Claims, 6 Drawing Sheets

(56) References Cited

U.S. PATENT DOCUMENTS

| | | | | |
|---|---|---|---|---|
| 2019/0047143 | A1* | 2/2019 | Matsudaira | B25J 13/085 |
| 2021/0264269 | A1* | 8/2021 | Sato | G06N 3/0464 |
| 2022/0056953 | A1* | 2/2022 | Fujimoto | F04D 29/058 |

FOREIGN PATENT DOCUMENTS

| | | | |
|---|---|---|---|
| JP | 2018-171663 | A | 11/2018 |
| WO | 2018/110305 | A1 | 6/2018 |

OTHER PUBLICATIONS

Bush et al., Risk-based sensing in support of adjustable autonomy, 2012, IEEE, p. 1-18 (Year: 2012).*

Greigarn et al., Task-Oriented Active Sensing via Action Entropy Minimization, 2019, IEEE, p. 1-14 (Year: 2019).*

Savarimuthu et al., Teaching a Robot the Semantics of Assembly Tasks, 2017, IEEE, p. 1-23 (Year: 2017).*

Savarimuthu et al., Teaching a Robot the Semantics of Assembly Tasks, 2017, IEEE, p. 1-23 (Year: 2019).*

JP Office Action for JP Application No. 2022-529124, mailed on Oct. 3, 2023 with English Translation.

International Search Report for PCT Application No. PCT/JP2020/021528, mailed on Sep. 24, 2020.

Anusha Nagabandi, Chelsea Finn & Sergey Levine,"DEEP Online Learning Via Meta-Learning: Continual Adaptation for Model-Based RL", arXiv preprint atXiv: 1812, 07671, 2018.

Anusha Nagabandi et al.,"LEARNING To Adapt in Dynamic, Real-World Environments Through Meta-Reinforcement Learning"arXiv:1803.11347v6 [cs.LG], Feb. 27, 2019.

* cited by examiner

PLANNER DEVICE, PLANNING METHOD, PLANNING PROGRAM RECORDING MEDIUM, LEARNING DEVICE, LEARNING METHOD, AND LEARNING PROGRAM RECORDING MEDIUM

This application is a National Stage Entry of PCT/JP2020/021528 filed on Jun. 1, 2020, the contents of all of which are incorporated herein by reference, in their entirety.

TECHNICAL FIELD

The present disclosure relates to a planner device, a planning method, a planning program recording medium, a learning device, a learning method, and a learning program recording medium.

BACKGROUND ART

Non-Patent Literature 1 discloses technology for generating an environment model through online learning and searching for an optimal action in controlling a robot or the like whose environment changes with an action. Patent Literature 1 discloses technology for avoiding the so-called curse of dimensionality in reinforcement learning.

PRIOR ART DOCUMENTS

Patent Documents

Patent Document 1: Japanese Unexamined Patent Application, First Publication No. 2007-018490

Non-Patent Documents

Non-Patent Document 1

Anusha Nagabandi, Chelsea Finn and Sergey Levine, "Deep online learning via meta-learning: Continual adaptation for model-based RL", arXiv preprint atXiv: 1812.07671, 2018.

SUMMARY OF THE INVENTION

Problems to be Solved by the Invention

In technology described in Non-Patent Literature 1, it is preferable to increase the depth of a trajectory search and increase the number of trajectory patterns to be generated such that a more appropriate action is decided on. Here, if the search depth is P and the number of patterns is Q, an amount of calculation proportional to P×Q is required to decide on the action in the technology described in Non-Patent Literature 1.

However, in general, a period of time from a timing when a certain state is acquired to a timing when control is required to be executed is finite and it may not be possible to provide enough calculation time to obtain sufficient accuracy. For example, in gait control for a robot, a period of time allocated for calculation of control is generally several milliseconds and it is difficult to decide on an appropriate action within the period of time.

An example object of the present disclosure is to provide a planner device, a planning method, a planning program recording medium, a learning device, a learning method, and a learning program recording medium capable of accurately deciding on an action with a small amount of calculation.

Means for Solving the Problems

According to a first example aspect of the present invention, there is provided a planner device including: a state acquisition means configured to acquire a state of a control target at a first time; and an action decision means configured to decide on an action at a second time that is a control timing subsequent to the first time such that a value calculated when the state has been input to a pre-trained value function is largest, wherein the value function is trained such that a value related to a sum of rewards based on states of the control target at control timings between the second time and a third time subsequent to the second time is calculated when a process of deciding on an action between the second time and the third time from the state of the control target at the first time and the action at the second time has been iterated.

According to a second example aspect of the present invention, there is provided a planning method including: acquiring a state of a control target at a first time; and deciding on an action at a second time that is a control timing subsequent to the first time such that a value calculated when the state has been input to a pre-trained value function is largest, wherein the value function is trained such that a value related to a sum of rewards based on states of the control target at control timings between the second time and a third time subsequent to the second time is calculated when a process of deciding on an action between the second time and the third time from the state of the control target at the first time and the action at the second time has been iterated.

According to a third example aspect of the present invention, there is provided a recording medium storing a planning program for allowing a computer to: acquire a state of a control target at a first time; and decide on an action at a second time that is a control timing subsequent to the first time such that a value calculated when the state has been input to a pre-trained value function is largest, wherein the value function is trained such that a value related to a sum of rewards based on states of the control target at control timings between the second time and a third time subsequent to the second time is calculated when a process of deciding on an action between the second time and the third time from the state of the control target at the first time and the action at the second time has been iterated.

According to a fourth example aspect of the present invention, there is provided a learning device including: a prediction means configured to predict a state of a control target at a second time from a state of the control target at a first time and an action at the second time that is a control timing subsequent to the first time; a reward calculation means configured to calculate a sum of rewards based on states of the control target at control timings between the second time and a third time subsequent to the second time obtained by iteratively inputting an action after the second time to the prediction means as a value; and an update means configured to update, on the basis of the state, the action, and the value, a parameter of a value function such that the value function outputs the value by inputting the state of the control target at the first time and the action at the second time.

According to a fifth example aspect of the present invention, there is provided a learning method including: calculating a sum of rewards based on states of a control target at control timings between a second time and a third time subsequent to the second time obtained by iteratively inputting an action after the second time to a prediction function for predicting a state of the control target at the second time from a state of the control target at a first time and an action at the second time that is a control timing subsequent to the first time as a value; and updating, on the basis of the state, the action, and the value, a parameter of a value function such that the value function outputs the value by inputting the state of the control target at the first time and the action at the second time.

According to a sixth example aspect of the present invention, there is provided a recording medium storing a learning program for allowing a computer to: calculate a sum of rewards based on states of a control target at control timings between a second time and a third time subsequent to the second time obtained by iteratively inputting an action after the second time to a prediction function for predicting a state of the control target at the second time from a state of the control target at a first time and an action at the second time that is a control timing subsequent to the first time as a value; and update, on the basis of the state, the action, and the value, a parameter of a value function such that the value function outputs the value by inputting the state of the control target at the first time and the action at the second time.

Effects of the Invention

According to at least one of the example aspects described above, the planner device can accurately decide on an action with a small amount of calculation.

EXAMPLE EMBODIMENT

First Example Embodiment

<<Configuration of Planner Device 10>>

Embodiments will be described in detail below with reference to the drawings.

A planner device 10 (shown in FIG. 1) according to a first example embodiment is provided for a control target and decides on an action of the control target on the basis of a measured signal obtained from a sensor of the control target. Examples of the control target include a robot, a plant, and infrastructure. The number of control targets may be one or two or more.

Examples of the action of the control target decided on by the planner device 10 include an amount of manipulation on an actuator of the control target and the like. For example, the planner device 10 according to the first example embodiment decides on an amount of rotation of a joint of each leg such that a quadrupedal robot walks without falling over on the basis of a posture and a surrounding environment measured by the sensor attached to the robot.

Examples of the action of the control target decided on by the planner device 10 include a device of the control target in the plant (opening and closing of a valve, movement of a transport device, and the like). For example, the planner device 10 according to the first example embodiment decides on the opening/closing (or an amount of opening/closing) of the valve connected to a pipe such that the pipe can be maintained in a normal state on the basis of a flow rate or the like measured by a sensor that measures the flow rate of a substance in the pipe.

In the following description, for convenience, it is assumed that the planner device 10 decides on the action of the control target at a control timing. It is assumed that the planner device 10 executes an action decision process a plurality of times. A plurality of control timings may be at regular intervals or irregular intervals.

Figure 1:
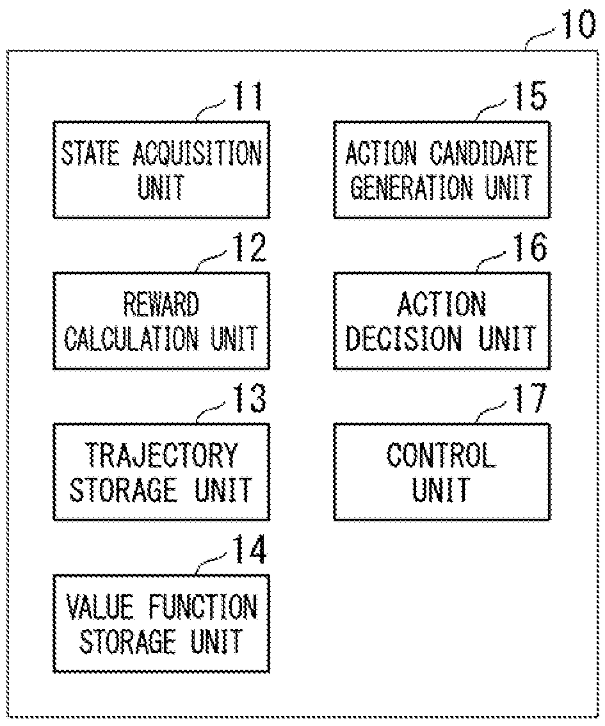
FIG. 1 is a schematic block diagram showing a configuration of a planner device according to a first example embodiment.

FIG. 1 is a schematic block diagram showing a configuration of the planner device 10 according to the first example embodiment. The planner device 10 includes a state acquisition unit 11, a reward calculation unit 12, a trajectory storage unit 13, a value function storage unit 14, an action candidate generation unit 15, an action decision unit 16, and a control unit 17.

The state acquisition unit 11 acquires a measured value indicating a state of the control target from various types of sensors provided for the control target. The state acquisition unit 11 is an example of a state acquisition means.

The reward calculation unit 12 calculates a reward based on the state and action of the control target on the basis of a measured value obtained by the state acquisition unit 11 and an action of the control target at the previous control timing.

The trajectory storage unit 13 stores trajectory data that is a time-series of combinations of the measured value acquired by the state acquisition unit 11, the reward calculated by the reward calculation unit 12, and the action decided on by the action decision unit 16.

The reward represents, for example, a degree of proximity to a target state of the control target. The reward is a function of the state and action of the control target.

The value function storage unit 14 stores a value function for outputting a value for an action using trajectory data related to control timings of the most recent N (N is a natural number) steps and an action at the next control timing of the trajectory data as inputs. The value calculated by the value function according to the first example embodiment is a value corresponding to a state of the control target that changes with the input action. A value function according to the first example embodiment is, for example, a trained machine learning model. A value function training method will be described below with reference to FIG. 3.

The action candidate generation unit 15 generates candidates for a plurality of actions at the next control timing. For example, the action candidate generation unit 15 may generate the candidates for the plurality of actions on the basis of the trajectory data stored in the trajectory storage unit 13 or may generate the candidates for the plurality of actions on the basis of random numbers.

The action decision unit 16 decides on an action to be applied to the control target on the basis of a value function stored in the value function storage unit 14, the trajectory data stored in the trajectory storage unit 13, and the candidates for the plurality of actions generated by the action candidate generation unit 15. Specifically, the action decision unit 16 decides on an action in the following procedure. First, the action decision unit 16 calculates a value for each candidate by inputting the trajectory data and each of the candidates for the plurality of actions to the value function. For example, the action decision unit 16 decides on a candidate with a largest value among the candidates for the plurality of actions as an action to be applied to the control target. The action decision unit 16 is an example of an action decision means.

The control unit 17 outputs the action decided on by the action decision unit 16 to the control target.

<<Operation of Planner Device 10>>

Figure 2:
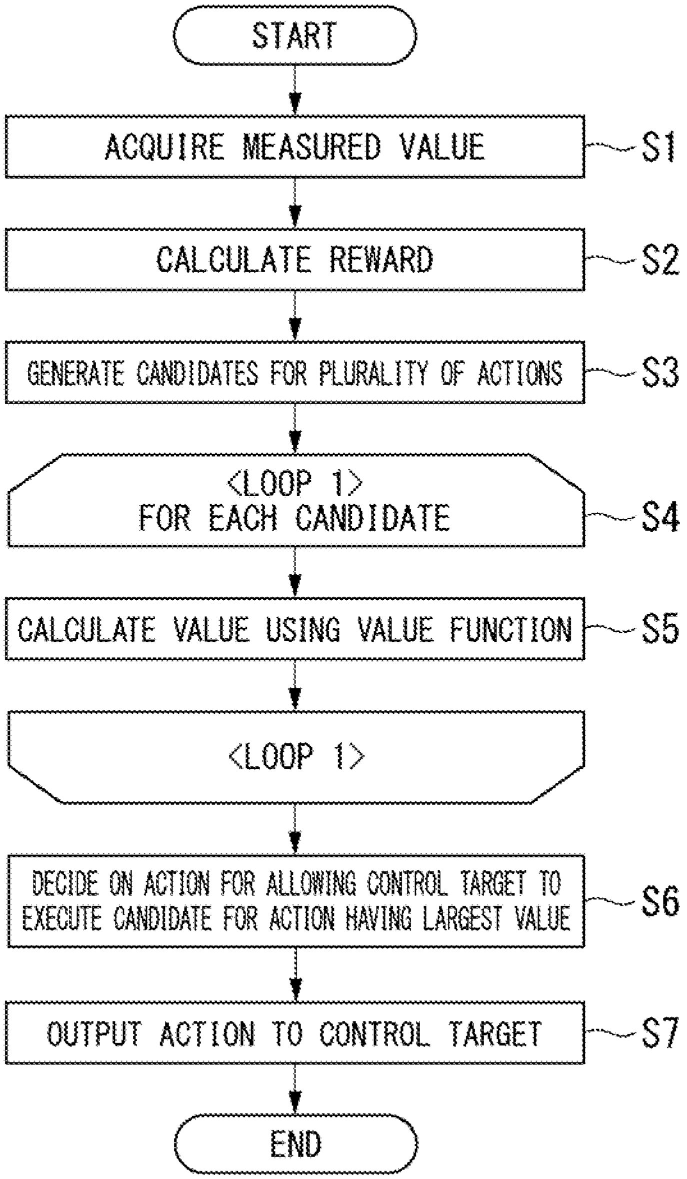
FIG. 2 is a flowchart showing an operation of the planner device according to the first example embodiment.

FIG. 2 is a flowchart showing an operation of the planner device 10 according to the first example embodiment.

The planner device 10 executes the following process at each control timing of the control target. First, the state acquisition unit 11 of the planner device 10 acquires a measured value from a sensor of the control target (step S1). The state acquisition unit 11 records the acquired measured value in the trajectory storage unit 13. Subsequently, the reward calculation unit 12 calculates a reward for the previous action on the basis of the measured value acquired in step S1 and the action at the previous control timing stored in the trajectory storage unit 13 (step S2). The reward calculation unit 12 records the calculated reward in the trajectory storage unit 13.

The action candidate generation unit 15 generates candidates for a plurality of actions at the next control timing (step S3). The action decision unit 16 selects the candidates for the plurality of actions generated in step S3 one by one and executes the processing of step S5 for each candidate (step S4). The action decision unit 16 calculates a value with respect to the candidate by inputting the trajectory data stored in the trajectory storage unit 13 and the candidate for the action selected in step S4 to the value function stored in the value function storage unit 14 (step S5). For example, the action decision unit 16 decides on the candidate with the largest value among the candidates for the plurality of actions as the action to be applied to the control target (step S6). The action decision unit 16 records the decided action in the trajectory storage unit 13. The control unit 17 outputs the action decided on by the action decision unit 16 to the control target (step S7).

In other words, an amount of calculation in one control period of the planner device 10 according to the first example embodiment is proportional to the number of candidates for an action generated by the action candidate generation unit 15.

<<Learning Device>>

A process of training the value function of the planner device 10 will be described below.

A value function is trained by the learning device 20. The learning device 20 may be provided as a device separate from the planner device 10 or may be provided integrally with the planner device 10.

Figure 3:
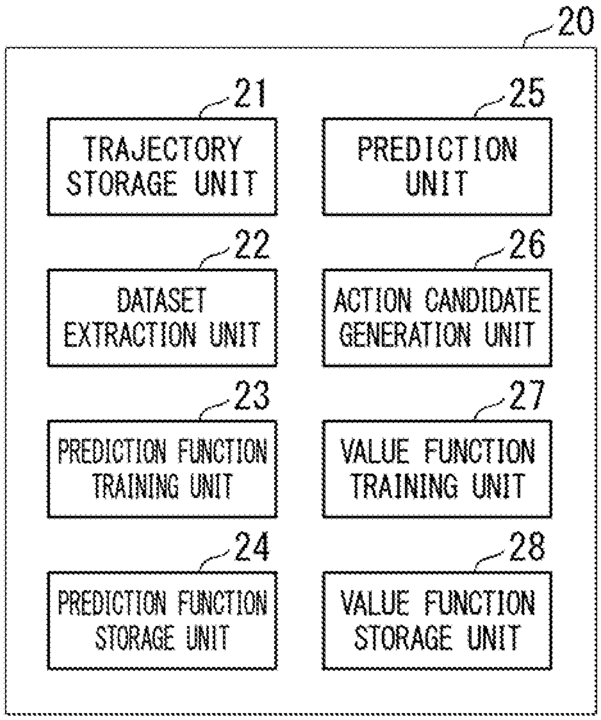
FIG. 3 is a schematic block diagram showing a configuration of a learning device according to the first example embodiment.

FIG. 3 is a schematic block diagram showing a configuration of the learning device 20 according to the first example embodiment. The learning device 20 includes a trajectory storage unit 21, a dataset extraction unit 22, a prediction function training unit 23, a prediction function storage unit 24, a prediction unit 25, an action candidate generation unit 26, a value function training unit 27, and a value function storage unit 28.

The trajectory storage unit 21 stores trajectory data when the control target has previously operated. The length of the trajectory data stored in the trajectory storage unit 21 is longer than at least the length of the trajectory data used for inputting the value function (control timings of N steps).

The dataset extraction unit 22 extracts a learning dataset used for training a prediction function and a value function from the trajectory data stored in the trajectory storage unit 21.

The prediction function training unit 23 learns parameters of the prediction function on the basis of the learning dataset extracted by the dataset extraction unit 22. The prediction function training unit 23 learns the parameters of the prediction function such that a state and a reward related to the next timing are output when the trajectory data related to the control timings of the most recent N steps and the action related to the next control timing have been input. The prediction function includes a machine learning model such as a neural network.

The prediction function storage unit 24 stores the trained prediction function.

The prediction unit 25 predicts a state and a reward related to the next timing from the input trajectory data and action using the prediction function stored in the prediction function storage unit 24. The prediction unit 25 is an example of a prediction means.

The action candidate generation unit 26 generates candidates for a plurality of actions at the next control timing. For example, the action candidate generation unit 26 may generate the candidates for the plurality of actions on the basis of the trajectory data or may generate the candidates for the plurality of actions on the basis of random numbers.

The value function training unit 27 learns parameters of the value function on the basis of a learning dataset extracted by the dataset extraction unit 22, a candidate for an action generated by the action candidate generation unit 26, and a state and a reward predicted by the prediction unit 25. The value function training unit 27 learns the parameters of the value function such that a value corresponding to a sum of rewards at control timings of P (P is a natural number) steps in the future is output. The value function training unit 27 is an example of a reward calculation means and an update means.

The value function storage unit 28 stores a trained value function.

<<Training of Prediction Function>>

Before the value function is trained, the learning device 20 learns the parameters of the prediction function.

The dataset extraction unit 22 extracts a plurality of time series of combinations of states, actions, and rewards related to control timings of (N+1) steps as learning datasets from the trajectory data stored in the trajectory storage unit 21. The dataset extraction unit 22 uses an extracted time series of combinations of states, actions, and rewards related to control timings for N steps as the trajectory data. The prediction function training unit 23 updates parameters of a prediction function in a learning process in which trajectory data related to the control timings for the N steps and an action of an $(N+1)^{th}$ step are used as input samples and a state and a reward of an $(N+1)^{th}$ step are used as output samples. The dataset extraction unit 22 records an updated prediction function in the prediction function storage unit 24.

<<Training of Value Function>>

Figure 4:
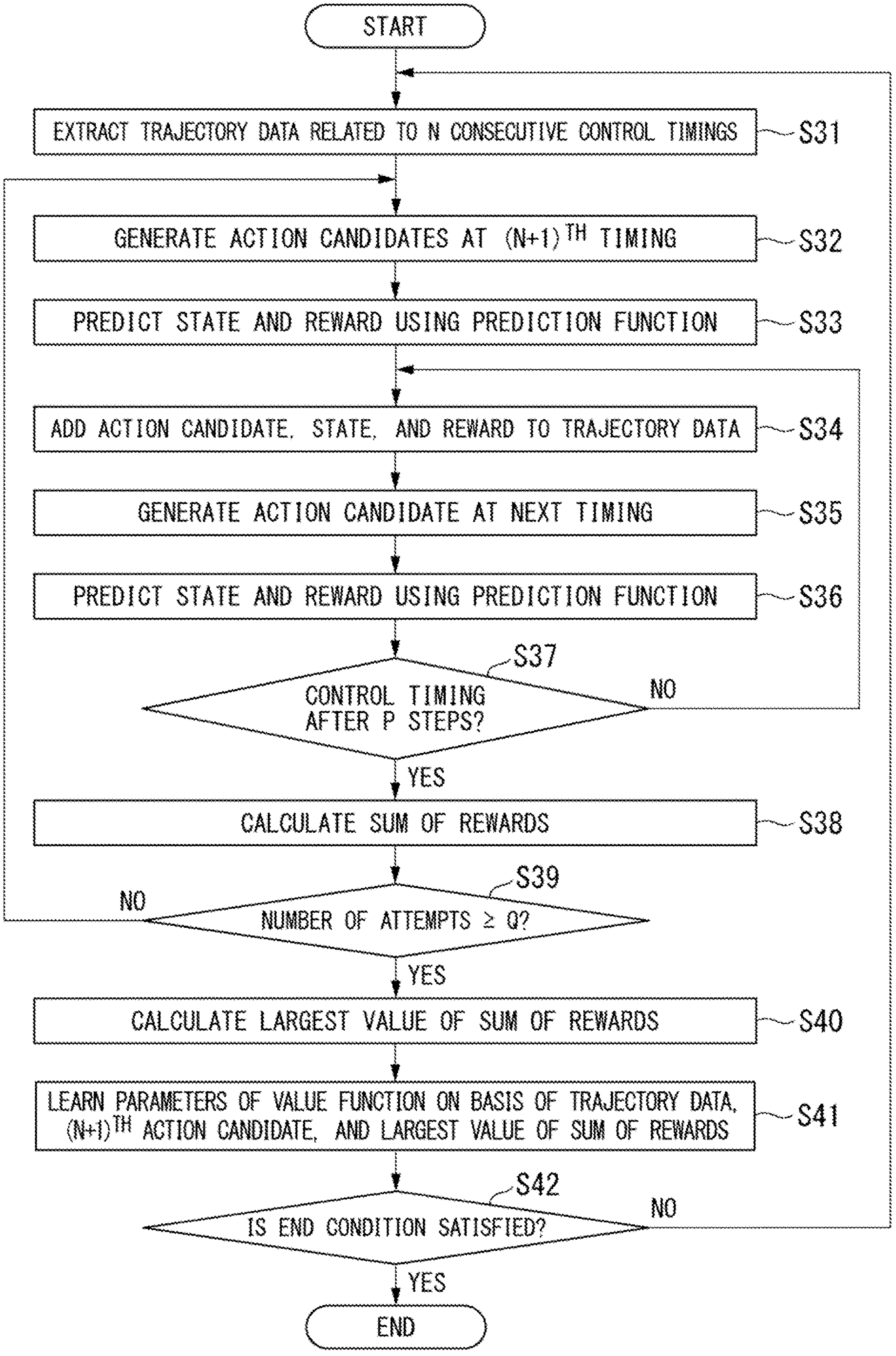
FIG. 4 is a flowchart showing a value function training process of the learning device according to the first example embodiment.

When the parameters of the prediction function are updated, the learning device 20 learns the parameters of the value function. FIG. 4 is a flowchart showing a value function training process of the learning device 20 according to the first example embodiment.

The dataset extraction unit 22 extracts, from the trajectory data stored in the trajectory storage unit 21, a time series of combinations of states, actions, and rewards related to control timings of consecutive N (N is a natural number) steps as trajectory data for learning (step S31). The action candidate generation unit 26 generates action candidates at the next control timing (an $(N+1)^{th}$ step control timing) of the extracted trajectory data (step S32). The prediction unit 25 predicts the state and reward at the next control timing by substituting the trajectory data extracted in step S31 and the action candidate generated in step S32 into the prediction function stored in the prediction function storage unit 24 (step S33).

Subsequently, the dataset extraction unit 22 adds the generated action candidates and the predicted states and rewards to the trajectory data (step S34). The action candidate generation unit 26 further generates action candidates at the next control timing (step S35). The prediction unit 25 predicts a state and a reward at the next control timing by substituting the trajectory data related to the control timings of the most recent N steps generated in step S34 and the action candidate generated in step S35 into the prediction function stored in the prediction function storage unit 24 (step S36).

The value function training unit 27 determines whether or not the action candidate generated in step S35 is an action candidate related to a control timing after the P steps from the trajectory data extracted in step S31 (step S37). When the generated action candidate is an action candidate related to a control timing before the P steps (step S37: NO), the learning device 20 returns the process to step S34 and further predicts a state and a reward with respect to the next control timing.

When the generated action candidate is an action candidate related to a control timing after the P steps (step S37: YES), the value function training unit 27 calculates a sum of rewards in the P steps (step S38). The sum of rewards may be a weighted sum in consideration of the discount rate over time. Subsequently, the value function training unit 27 determines whether or not the number of attempts to generate action candidates for the P steps is greater than or equal to Q (Q is a natural number) (step S39). When the number of attempts for generating action candidates for the P steps is less than Q (step S39: NO), the process returns to step S32, action candidates for the P steps are generated again, and rewards are predicted.

When the number of attempts to generate action candidates for the P steps is greater than or equal to Q (step S39: YES), a largest value of the sum of rewards calculated Q times in step S38 is identified (step S40).

The value function training unit 27 learns parameters of the value function by using the trajectory data extracted in step S31 and the action candidates generated in step S32 as input samples and the sum of rewards identified in step S40 as an output sample (step S41). The value function training unit 27 determines whether or not a learning end condition for the value function is satisfied (step S42). Learning end conditions include, for example, a condition that a rate of change in a parameter is less than a threshold value, a condition that the number of attempts exceeds a prescribed number, and the like. When the leaning end condition for the value function is not satisfied (step S42: NO), the process returns to step S31 to iteratively update the parameters. On the other hand, when the learning end condition for the value function is satisfied (step S42: YES), the value function training unit 27 records the trained value function in the value function storage unit 28 and ends the process. The value function stored in the value function storage unit 28 is recorded in the value function storage unit 14 of the planner device 10.

Operation and Effects

As described above, the value function according to the first example embodiment is trained such that a value related to a sum of rewards based on states of the control target at control timings from (N+1) to (N+P) is calculated when a process of deciding on an action until a control timing of an $(N+P)^{th}$ step from a state of the control target at the control timing of the $N^{th}$ step and an action at the control timing of the $(N+1)^{th}$ step has been iterated. Thereby, the planner device 10 can decide on an action that maximizes the sum of rewards after P steps without iteratively calculating states and values for the P steps. That is, when the search depth is P and the number of patterns is Q, an action is decided on with an amount of calculation proportional to (P×Q) in the technology described in Non-Patent Literature 1, whereas that the planner device 10 according to the first example embodiment can decide on an action with an amount of calculation proportional to Q.

Other Embodiments

Although the embodiment has been described in detail above with reference to the drawings, a specific configuration is not limited to the embodiment described above and various design changes and the like can be made. That is, in other embodiments, the order of the processes described above may be changed as appropriate. Also, some processes may be executed in parallel.

The planner device 10 and the learning device 20 according to the above-described embodiment may be configured with a single computer or the configuration of the planner device 10 or the learning device 20 may be divided into a plurality of computers and arranged and the plurality of computers may function as the planner device 10 or the learning device 20 in cooperation with each other. Although the planner device 10 according to the first example embodiment is mounted in a control target, the present invention is not limited thereto. For example, the planner device 10 according to another embodiment may be provided remotely from the control target, receive a measured value of a state quantity from the control target by communicating with the control target, and transmit action data to the control target.

Also, when the planner device 10 and the learning device 20 are mounted in the control target, the learning device 20 can periodically update the prediction function and the value function using the trajectory data stored in the trajectory storage unit 13 of the planner device 10. That is, the learning device 20 can update the prediction function and the value function online by installing the planner device 10 and the learning device 20 in the control target.

Although the prediction function according to the above-described embodiment calculates a state and a reward using the trajectory data and the action as inputs, the present invention is not limited thereto. For example, a prediction function according to another embodiment may output a state without outputting a reward. In this case, the reward may be calculated separately, for example, by the reward calculation unit 12 or the like, on the basis of the state predicted from the prediction function.

Although the prediction function according to the above-described embodiment calculates the state and the reward using trajectory data for N steps, the present invention is not limited thereto. For example, a prediction function according to another embodiment may output a state and a reward at the next control timing on the basis of the most recent state and action.

<Basic Configuration>

Figure 5:
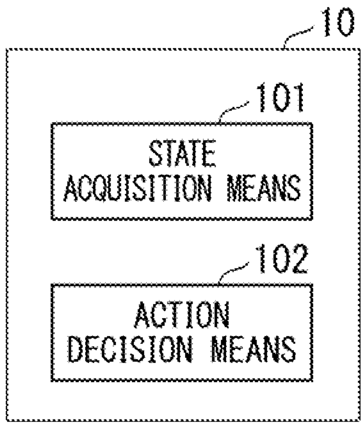
FIG. 5 is a schematic block diagram showing a basic configuration of the planner device.

FIG. 5 is a schematic block diagram showing a basic configuration of the planner device 10.

Although the configuration shown in FIG. 1 has been described as one embodiment of the planner device 10 in the above-described embodiment, the basic configuration of the planner device 10 is as shown in FIG. 5.

That is, the planner device 10 has a state acquisition means 101 and an action decision means 102 as a basic configuration.

The state acquisition means 101 acquires a state of the control target at a first time.

The action decision means 102 decides on an action at a second time that is a control timing subsequent to the first time such that a value calculated when the state has been input to a pre-trained value function is largest.

The value function is trained such that a value related to a sum of rewards based on states of the control target at control timings between the second time and a third time subsequent to the second time is calculated when a process of deciding on an action between the second time and the third time from the state of the control target at the first time and the action at the second time has been iterated.

Thereby, the planner device 10 can accurately decide on an action with a small amount of calculation.

Figure 6:
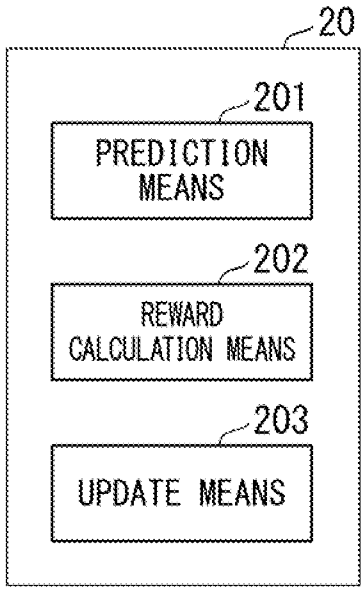
FIG. 6 is a schematic block diagram showing a basic configuration of the learning device.

FIG. 6 is a schematic block diagram showing a basic configuration of the learning device 20.

Although the configuration shown in FIG. 3 has been described as one embodiment of the learning device 20 in the above-described embodiment, the basic configuration of the learning device 20 is as shown in FIG. 6.

That is, the learning device 20 has a prediction means 201, a reward calculation means 202, and an update means 203 as a basic configuration.

The prediction means 201 predicts a state of a control target at a second time from a state of the control target at a first time and an action at the second time that is a control timing subsequent to the first time.

The reward calculation means 202 calculates a sum of rewards based on states of the control target at control timings between the second time and a third time subsequent to the second time obtained by iteratively inputting an action after the second time to the prediction means 201 as a value.

The update means 203 updates, on the basis of the state, the action, and the value, a parameter of a value function such that the value function outputs the value by inputting the state of the control target at the first time and the action at the second time.

Thereby, the learning device 20 can generate a value function for accurately deciding on an action with a small amount of calculation.

<Computer Configuration>

Figure 7:
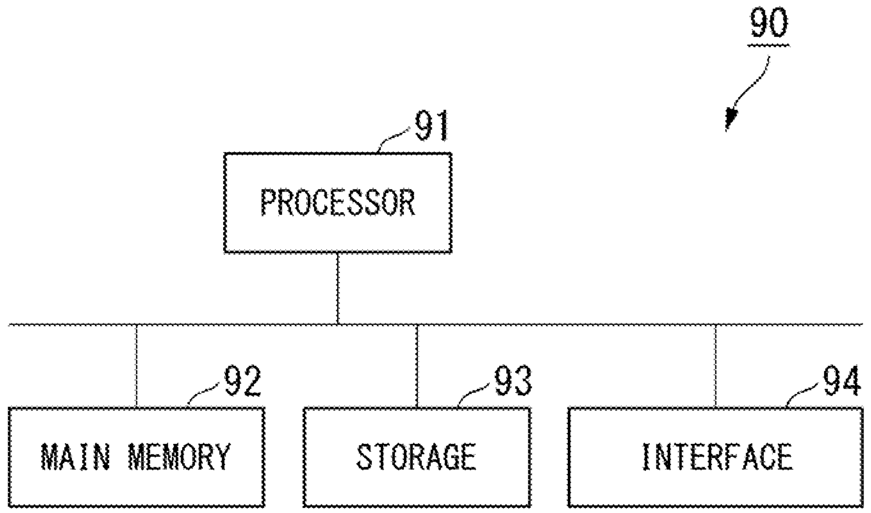
FIG. 7 is a schematic block diagram showing a configuration of a computer according to at least one example embodiment.

FIG. 7 is a schematic block diagram showing a configuration of a computer according to at least one embodiment.

A computer 90 includes a processor 91, a main memory 92, a storage 93, and an interface 94.

The planner device 10 and the learning device 20 described above are mounted in the computer 90. The operation of each of the above-described processing units is stored in the storage 93 in the form of a program. The processor 91 reads a program from the storage 93, loads the program into the main memory 92, and executes the above process in accordance with the program. Also, the processor 91 secures a storage area corresponding to each of the above-described storage units in the main memory 92 in accordance with the program. Examples of the processor 91 include a central processing unit (CPU), a graphic processing unit (GPU), a microprocessor, and the like.

The program may be a program for implementing some of the functions exerted on the computer 90. For example, the program may exert its function in combination with another program already stored in the storage or in combination with another program mounted in another device. In another embodiment, the computer 90 may include a custom large-scale integrated circuit (LSI) such as a programmable logic device (PLD) in addition to or in place of the above configuration. Examples of the PLD include a programmable array logic (PAL), a generic array logic (GAL), a complex programmable logic device (CPLD), and a field programmable gate array (FPGA). In this case, some or all of the functions implemented by the processor 91 may be implemented by the integrated circuit. This integrated circuit is also included in examples of the processor.

Examples of the storage 93 include a hard disk drive (HDD), a solid-state drive (SSD), a magnetic disk, a magneto-optical disk, a compact disc read only memory (CD-ROM), a digital versatile disc read only memory (DVD-ROM), a semiconductor memory, and the like. The storage 93 may be internal media directly connected to a bus of the computer 90 or external media connected to the computer 90 via the interface 94 or a communication circuit. Also, when the above program is distributed to the computer 90 via a communication circuit, the computer 90 receiving the distributed program may load the program into the main memory 92 and execute the above process. In at least one embodiment, the storage 93 is a non-transitory tangible storage medium.

Also, the program may be a program for implementing some of the above-mentioned functions. Furthermore, the program may be a so-called differential file (differential program) for implementing the above-described function in combination with another program already stored in the storage 93.

Although the present invention has been described with reference to the embodiments (and examples), the present invention is not limited to the above-described embodiments (and examples). Various changes that can be understood by those skilled in the art can be made in the configuration and details of the present invention within the scope of the present invention.

INDUSTRIAL APPLICABILITY

The planner device can be used to control a control target such as a transport device, a robot, a plant, or infrastructure.

DESCRIPTION OF REFERENCE SYMBOLS

10 Planner device
11 State acquisition unit
12 Reward calculation unit
13 Trajectory storage unit
14 Value function storage unit

15 Action candidate generation unit
16 Action decision unit
17 Control unit
20 Learning device
21 Trajectory storage unit
22 Dataset extraction unit
23 Prediction function training unit
24 Prediction function storage unit
25 Prediction unit
26 Action candidate generation unit
27 Value function training unit
28 Value function storage unit

What is claimed is:

1. A planner apparatus comprising:
at least one memory configured to store instructions; and
at least one processor configured to execute the instructions to:
acquire a state of a control target at a first time; and
decide on an action at a second time that is a control timing subsequent to the first time such that a value calculated when the state has been input to a pre-trained value function is largest,
wherein the value function is trained such that a value related to a sum of rewards based on states of the control target at control timings between the second time and a third time subsequent to the second time is calculated when a process of deciding on an action between the second time and the third time from the state of the control target at the first time and the action at the second time has been iterated.

2. The planner apparatus according to claim 1, wherein the at least one processor is configured to execute the instructions to:
decide on the action on a basis of trajectory data including a time series of the state until the first time is reached and the value function, and
wherein the value function is trained such that the value is calculated from the trajectory data and the action at the second time.

3. The planner apparatus according to claim 2, wherein the trajectory data includes a time series of combinations of states and actions of the control target and rewards.

4. The planner apparatus according to claim 1, wherein in a value function training process, the value is calculated by iteratively inputting an action to a prediction function of predicting a state of the control target and a reward at a subsequent control timing from a state of the control target at a reference time and an action at the control timing subsequent to the reference time and obtaining the rewards between the second time and the third time.

5. The planner apparatus according to claim 4, wherein the prediction function is a trained model trained, by using previous state and a previous action of the control target as a learning dataset, to output a state at the second time by inputting the state of the control target at the first time and the action at the second time.

6. A planning method comprising:
acquiring a state of a control target at a first time; and
deciding on an action at a second time that is a control timing subsequent to the first time such that a value calculated when the state has been input to a pre-trained value function is largest,
wherein the value function is trained such that a value related to a sum of rewards based on states of the control target at control timings between the second time and a third time subsequent to the second time is calculated when a process of deciding on an action between the second time and the third time from the state of the control target at the first time and the action at the second time has been iterated.

7. A non-transitory computer-readable recording medium storing a planning program for allowing a computer to:
acquire a state of a control target at a first time; and
decide on an action at a second time that is a control timing subsequent to the first time such that a value calculated when the state has been input to a pre-trained value function is largest,
wherein the value function is trained such that a value related to a sum of rewards based on states of the control target at control timings between the second time and a third time subsequent to the second time is calculated when a process of deciding on an action between the second time and the third time from the state of the control target at the first time and the action at the second time has been iterated.

* * * * *